United States Patent [19]
Sutyak

[11] 3,733,943
[45] May 22, 1973

[54] CUTTING METHODS
[75] Inventor: John J. Sutyak, Pittsburgh, Pa.
[73] Assignee: Mesta Machine Company, Pittsburgh, Pa.
[22] Filed: Sept. 9, 1971
[21] Appl. No.: 179,041

Related U.S. Application Data
[63] Continuation-in-part of Ser. No. 747,219, July 24, 1968, Pat. No. 3,657,953.

[52] U.S. Cl. ..........................83/7, 83/23, 83/39, 83/56
[51] Int. Cl. ..............................B23d 19/02
[58] Field of Search..................83/6, 7, 8, 9, 10, 83/11, 12, 13, 14, 56, 483, 485, 487, 508, 614, 622

[56] References Cited

UNITED STATES PATENTS

| | | | |
|---|---|---|---|
| 3,476,000 | 11/1969 | Wheeler | 83/487 X |
| 3,491,642 | 1/1970 | Weyant | 83/503 |
| 3,595,455 | 7/1971 | Pace | 83/13 X |

FOREIGN PATENTS OR APPLICATIONS

| | | | |
|---|---|---|---|
| 437,291 | 11/1926 | Germany | 83/487 |
| 1,144,082 | 2/1963 | Germany | 83/614 |
| 1,901,249 | 8/1970 | Germany | 83/508 |
| 398,018 | 9/1933 | Great Britain | 83/13 |
| 619,648 | 5/1961 | Canada | 83/487 |

Primary Examiner—Andrew R. Juhasz
Assistant Examiner—James F. Coan
Attorney—Donn J. Smith

[57] ABSTRACT

A method of cutting thick plate material, said method comprising the steps of supporting said material on elongated cutting means co-extending with an intended cut in said material and aligned therewith, scoring said material along said cut to a depth at least equal to the surface hardness of said material, and cutting said material to a further depth along said scoring, said further depth being less than the thickness of said material.

A method of slitting thick plate material, said method comprising the steps of supporting said material on a pair of generally parallel knife edges co-extending with an intended cut and aligned therewith, scoring said material along each of said knife edges respectively, and slitting said material along each of said knife edges so as to coincide with said scoring.

Also disclosed is a method for countering diminishment of cutting forces from bowing of certain components of the cutting apparatus.

17 Claims, 14 Drawing Figures

INVENTOR
John J. Sutyak

CUTTING METHODS

This application is a continuation-in-part of my co-pending co-assigned application entitled EDGING AND SLITTING APPARATUS AND METHOD filed July 24, 1968, Ser. No. 747,219, now U.S. Pat. No. 3,657,953.

The present invention relates to novel cutting methods and more particularly to methods of the character described capable of trimming and slitting operations upon relatively thick materials, such as steel plate. My invention contemplates in addition, novel methods for preventing curling of scrap, for feeding the plate or other material into the cutting apparatus, and for obviating edge or other distortions in the cut materials.

Although the disclosed cutting apparatus and methods are described with particular reference to cutting steel plate, it will be obvious that the invention is capable of use with other difficult-to-cut materials.

In recent years the demand for accurately trimmed plate of substantial thickness has increased to a considerable extent. Heretofore it has been necessary to rough-cut plate material followed by retrimming the edges thereof with squaring shears. Squaring shears conventionally consist of a rotary cutting blade disposed for shearing action against a single flat shearing edge. The edge trimming produced by the squaring shear curls uncontrollably and complicates scrap handling. Obviously, conventional squaring shears cannot be used for slitting or severing relatively thick plate into smaller pieces. Therefore, relatively thick plates must be severed by burning or by means of a guillotine shear, afterwhich those edges of the plate sections adjacent the rough cut have to be trimmed or ground, when close tolerances are required. In the conventional case, three cutting operations are required in place of the single plate severing or slitting operation provided by my invention. Moreover, the accuracy of subsequent edge trimming operations with known cutting apparatus has left much to be desired. Curling and other distortion of the adjacent plate edges usually could not be avoided.

In addition to the aforementioned known cutting means, there are many known forms of rotary shears for cutting and/or slitting relatively thin, strip or sheet materials. Examples of such apparatus are shown in the U.S. Pats. to Knepshield No. 3,080,783; Clayton No. 2,309,045; Nash No. 2,203,738; Grevich No. 3,191,474 and Jones No. 3,257,887 which disclose rotary side trimmers, in the U.S. Pats. to Bottenhorn No. 2,679,900; Thomas No. 1,619,684; Cohen No. 2,307,452 and Hall No. 2,706,524 disclosing rotary shears for combined slitting and side trimming operations. British Pat. No. 707,428 and U.S. Pat. to Wheeler No. 3,476,000 are devoted to slitting operations of relatively thin sheet or strip. Also of interest is German Pat. No. 437,291 utilizing a series of rotary knives but incapable of plate-slitting operations.

None of these patents, however, discloses cutting operations for accurately and successively trimming and-/or slitting relatively thick steel plate. These cutting machines moreover impart a curl or other distortion to the trimmed or slit edges of the sheet material. Most importantly, none of these prior operations is capable of slitting relatively thick material such as steel plate and of controlling the slitting waste thereof to facilitate subsequent handling.

I overcome these disadvantages of the prior art by providing cutting apparatus and methods whereby a pair of tandemly mounted knives are urged against plate material or the like in opposition to a stationary elongated cutting edge. The first of the knives scores the plate material to a depth sufficient to penetrate a surface hardness, a work-hardened surface or other skin layer thereof. For most materials including steel plate, the first cutting means or knife need penetrate from only about 4 to about 10 percent of the thickness of the material. In this connection I have found that, in the case of steel plate, a penetration of the first cutting means greater than about 10 percent of the material thickness can induce a sufficiently steep cutting angle that edge cracking or other deformation can result. In the case of a rotary first cutting means, this limiting factor will depend to a considerable extent upon the diameter of the rotary knife, which in turn must be determined by the available cutting forces and the maximum cutting thickness of the steel plate. The second movable knife shears or parts the material. For materials such as steel plate, it is necessary for the second cutting means or knife to penetrate only about 30 – 35 percent of the material thickness. This arrangement enables my cutting apparatus to handle thicker plate materials with greater rapidity and accuracy and with considerably reduced power requirements. Further, the tandem and incremental cutting arrangement of my moving knives acts to impart cutting distortions of the first and second cutting means substantially exclusively to the slitting waste cut from the material, such that the distortions coact upon the waste to prevent the waste from curling and cork-screwing. Subsequent handling of the scrap is therefore greatly facilitated. Most importantly my novel cutting means and method do not distort the finished plate edges.

For plate slitting operations, each of my movable knives is provided with dual cutting edges for coaction respectively with a pair of elongated substantially parallel stationary cutting edges. This arrangement permits a relatively narrow strip of waste material to be removed from the plate during the slitting operation. The necessary but limited amount of cutting distortion, therefore, is imparted to the waste strip rather than to the edges of the severed plate sections. During the severing operation the plate material is scored and subsequently parted along closely paralleled cutting lines. Curling of the severed strip or slitting waste is substantially eliminated as the cutting distortions of the first and second cutting means are imparted substantially exclusively to the slitting waste, with the cutting distortions coacting upon the slitting waste such that the waste can be depressed between a pair of elongated stationary cutters without curling and jamming therebetween.

To ensure accuracy in cutting depth, as my cutting apparatus progresses along an elongated cut, I also desirably provide a pre-deformable reference member or contour bar along which the movable knives are dragged in making such cut. The movable carriage for the knives is backed up by the contour bar such that reactive cutting forces applied to the contour bar by the carriage return the adjacent portion of the contour bar to a parallel position relative to the plate material, irrespective of a given position of the knife carriage along the length of the contour bar.

My invention contemplates also a novel feed mechanism useful with my novel cutting apparatus for feeding plate material either lengthwise or widthwise into the cutting apparatus for slitting and/or edge-trimming operations.

I accomplish these desirable results by providing a method of cutting thick plate material, said method comprising the steps of supporting said material on elongated cutting means co-extending with an intended cut in said material and aligned therewith, scoring said material along said cut to a depth at least equal to the surface hardness of said material, and cutting said material to a further depth along said scoring, said further depth being less than the thickness of said material.

I also desirably provide a similar cutting method wherein said material is steel plate, and said further depth is between about 30 and about 35 percent of said material thickness.

I also desirably provide a method of slitting thick plate material, said method comprising the steps of supporting said material on a pair of generally parallel knife edges co-extending with an intended cut and aligned therewith, scoring said material along each of said knife edges respectively, and slitting said material along each of said knife edges so as to coincide with said scoring.

I also desirably provide a similar cutting method including the additional steps of removing a strip of slitting waste from said plate along said scoring, and imparting cutting distortions of said scoring and slitting steps substantially exclusively to said waste.

I also desirably provide a similar cutting method including the additional step of coacting said cutting distortions upon said slitting waste such that said waste is prevented from curling and jamming between said parallel knife edges.

I also desirably provide a method of slitting thick plate material, said method comprising the steps of supporting said material on elongated cutting means coextended with an intended cut in said material and aligned therewith, scoring said material along said cut, parting said material along said scoring, the forces normally associated with said scoring and parting normally diminishing between the ends and the middle of said cut, and applying an additional force in conjunction with said scoring and parting forces and in substantially the same direction thereof, said additional force being variable in compensation for the diminishment of said scoring and said parting forces.

I also desirably provide a similar method wherein said additional force is applied oppositely and variably between third said scoring and parting forces and a back-up force operable along said cut.

During the foregoing description, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
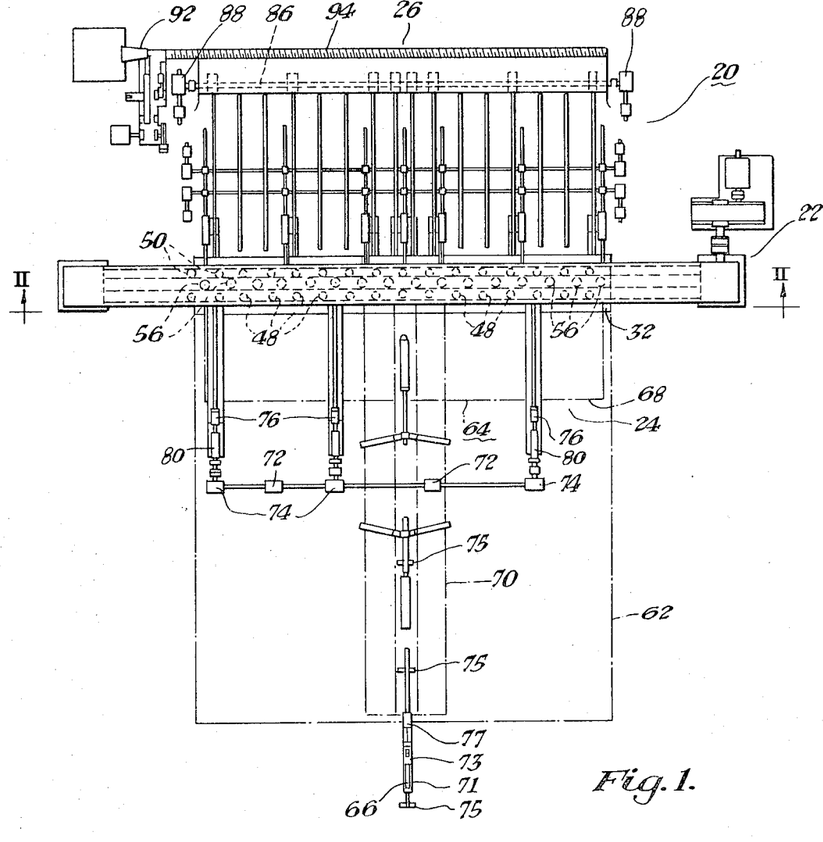
FIG. 1 is a top plan view of cutting and feeding apparatus and scrap disposal mechanism arranged in accordance with my invention.

Referring now more particularly to FIGS. 1-5 of the drawings, my novel cutting methods are exemplified by apparatus 20 including in this example progressive cutting mechanism 22, plate feeding mechanism 24 and scrap disposal mechanism 26. It will be understood, of course, that other forms of feeding and scrap disposal mechanisms can be employed with the cutting mechanism 22, or the feeding and/or scrap disposal mechanism can be omitted altogether depending upon the specific application of the invention. As better shown in FIG. 2, the cutting mechanism 22 includes a main support or bridging beam 28 supported at its ends upon uprights 30, which in turn are spaced from the ends of an elongated work table 32. The table 32 as better shown in FIG. 1 is disposed generally between the entry portion of the feeding mechanism 24 and the scrap disposal mechanism 26.

A contour bar or beam 34 is disposed in generally parallel, spaced relation between the bridging beam 28 and the table 32. To facilitate bending or contouring (FIG. 4) of the intermediate beam or contour bar 34, the ends thereof are pivotally connected to and supported on the uprights 30, as denoted by reference characters 36.

As described in greater detail below a knife carriage 38 is mounted for movement along the contour beam 34 for juxtaposition of its first and second cutting means, including cutters 40, 42 with elongated cutting means including one or more cutting blades 44, 46 (FIGS. 2, 6, 8 and 9) mounted in the table 32 and co-extending in this example with the length thereof.

Means are provided for anti-frictionally mounting the knife carriage 38 for movement along the contour beam 34 and for dragging the knife carriage along the length of the table 32. Such means are described in greater detail hereinafter. As better shown in FIGS. 1, 3 and 5, two rows of plate hold down cylinders 48, 50 are secured to the undersurface of the contour beam 34 in an array co-extending substantially with the length of the work-table 32. One row of the cylinders, for example the row 50, is actuated for holding down a plate section 52 (FIG. 7A) for edge trimming while both rows of cylinders 48, 50 are actuated for holding down plate sections 54a, 54b (FIG. 7) for plate slitting purposes. Each row of hold down cylinders is therefore actuated simultaneously but independently of the other row of cylinders, by suitable and known fluid circuitry (not shown).

Figure 2:
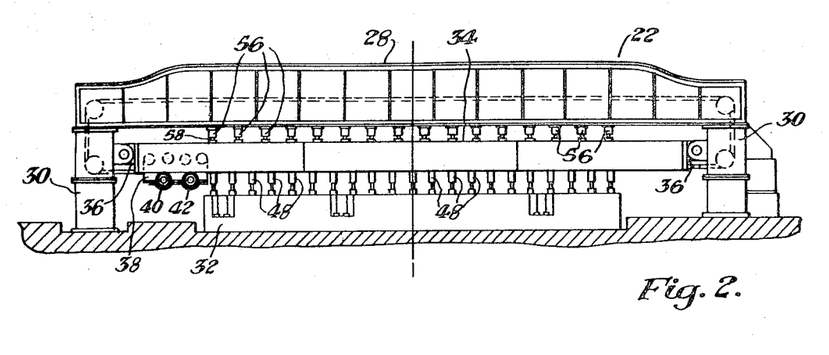
FIG. 2 is a front elevational view of the cutting apparatus as shown in FIG. 1 and taken along reference line II—II thereof.
Figure 4:
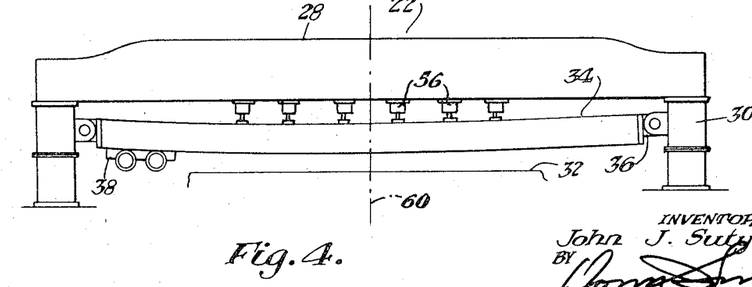
FIG. 4 is a schematic view similar to FIG. 2 and illustrating the operation of the aforementioned contour bar.
Figure 6:
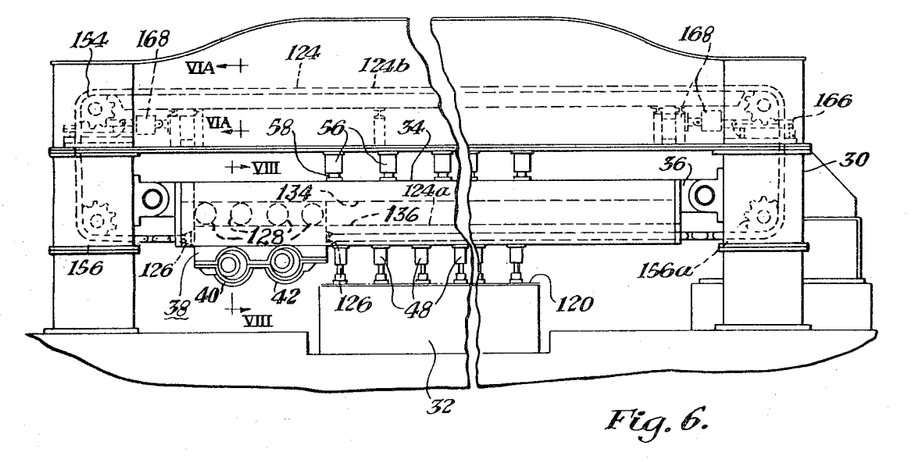
FIG. 6 is a partial, enlarged vertically sectioned view of the apparatus as shown in FIG. 2.

As better shown in FIGS. 2 and 4 and 6, a third array or row of hold down cylinders 56 are secured between the bridging beam 28 (which supplies a back-up force along the intended cut) and the top surface of the contour beam 34. With the knife carriage 38 in its non-operating position as shown in FIGS. 2 and 6 the contouring cylinders are variously actuated for the extension of their piston rods 58 through increasing distances from either end of the cylinder row 56 toward the center line 60 (FIG. 4) of the contour beam 34 and bridging beam 28. As the bridging or back-up beam 28 is constructed in much sturdier fashion, the contour beam 34 is slightly but preferentially bowed downwardly or toward the worktable 32 as shown in exaggerated form in FIG. 4. The degree to which the contour beam is bowed is preselected such that the reactive forces exerted upon the knife carriage and contour beam 34 at any point along the worktable 32 effectively cancels the displacement caused by bowing forces imparted to the contour beam at such point. As a result the contour beam 34 is returned to a reference plane parallel to the worktable 32 and the stationary cutters 44, 46 therein as shown in FIGS. 2 and 6. The contour beam 34 and its cylinders 56 supplies a variable force oppositely acting between the back-up force of the bridging beam 28 and the scoring and cutting or parting forces of the knives 40, 42, which normally would diminish between the ends and middle of the intended cut. The variable force thus supplied supplements the scoring and cutting forces and counteracts the tendency of the latter forces, to vary as the carriage is moved. A consistent and accurate depth of cut therefore can be made in the plate material by the cutters or knives 40, 42. The amount of prebowing of the contour beam 34 and the profile of the variable, supplementary forces therealong will depend upon the lengths and beam strengths of the bridging beam 28 and contour beam 34, structure of the prebowing cylinders 56, and the requisite scoring and cutting forces directed transversely of the material 52 or 54. These forces will vary with the hardness and thickness of the plate or other material 52 or 54 being cut. These parameters, however, can be readily calculated by those skilled in the art.

The feed mechanism 24 (FIG. 1) includes in this example a conventional castor bed denoted by chain outline 62 thereof. Suitable push mechanisms 64, 66 are provided respectively for feeding a plate lengthwise (chain outline 68) or widthwise (chain outline 70) into the cutting apparatus 22.

In this example, the lengthwise push means 64 includes a pair of laterally inter-connected drive motors 72 operating through speed reducers 74 to drive lead screws 76. Each lead screw 76 is provided with a suitable clamp 78 (FIG. 3) and air cylinder 80 or the like for engaging the lead screw with the trailing edge of plate 68.

When it is desired to feed the plate widthwise the plate is pivoted to the position 70 (FIG. 1) thereof by suitable means (not shown). The use of the castor bed 62 facilitates pivoting the plate between the position 68, 70 for trimming or squaring the four edges thereof and for making longitudinal and transverse cuts or slits therein. In the position 70 the plate is fed by stroking mechanism 71 including a relatively long stroke cylinder 73, the distal end of whose piston rod acts successively against stops 75 to move the plate 70 through the cutting apparatus 20. The chain conveyors 84 are more closely spaced in the area juxtaposed to the plate position 70, as better shown in FIGS. 1 and 10 in order to accommodate the increased loading. The stroking mechanism 71 is further provided with a cylinder operated jaw 77 of substantially conventional construction for engagement with the trailing edge of the plate.

After the cutting or slitting operation is completed the plate is pushed across the table 32, which is provided with lift cylinders 82 (FIGS. 10 and 12) for that purpose, and onto conveyor chains 84 driven by a common drive shaft 86, which has in this example drive means 88 coupled to each end thereof.

Figure 10:
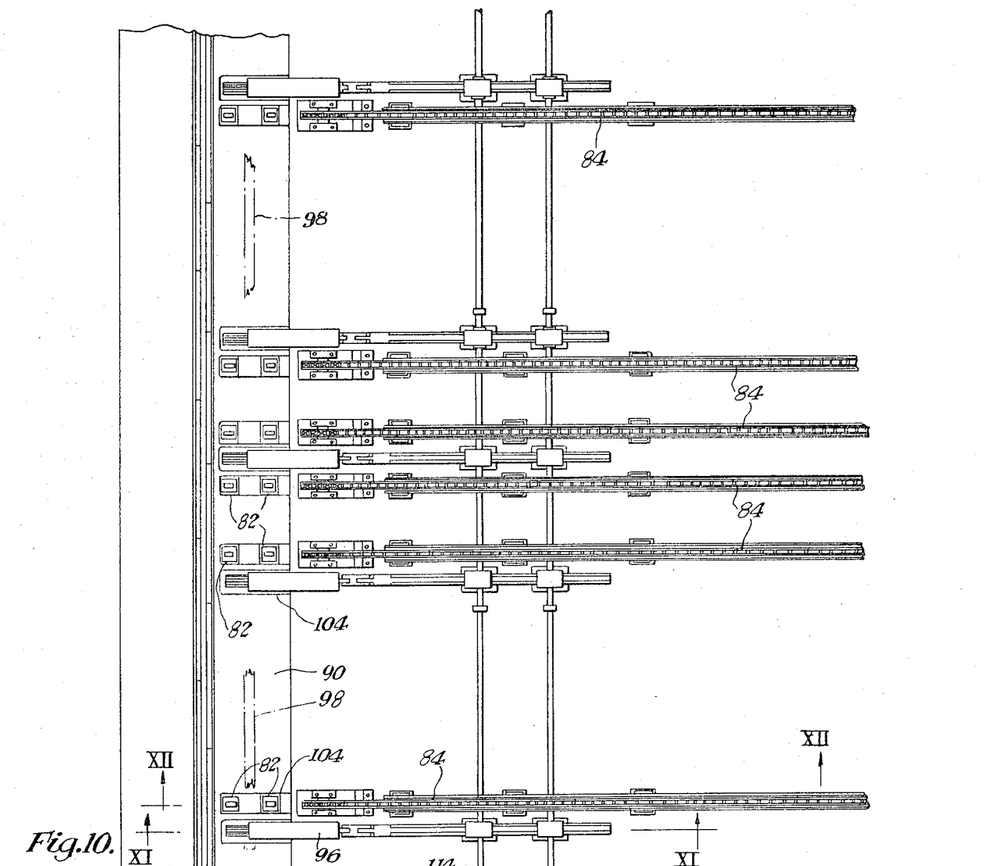
FIG. 10 is an enlarged partial top plan view of the feeding mechanism and work table shown in FIG. 1.
Figure 11:
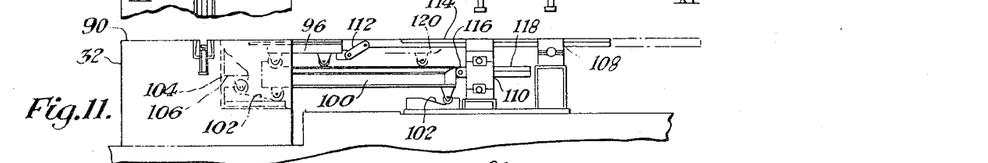
FIG. 11 is a partial cross sectional view of the mechanism as shown in FIG. 10 and taken along reference line XI—XI thereof.
Figure 12:
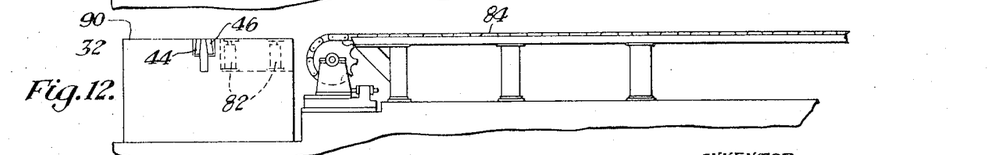
FIG. 12 is a cross sectional view of the mechanism as shown in FIG. 10 and taken along reference line XII—XII thereof.

Edge trimmings or slitting waste are, in somewhat a similar manner, removed from the table 32 by the disposal mechanism 26, as better shown in FIGS. 10-12. The cutting waste is pushed onto the right hand portion 90 of the table as viewed in FIG. 10 of the drawings where means, including a screw type scrap conveyor 94, are provided for conveying the scrap to conventional scrap shearing mechanism (not shown).

Specifically, the scrap is pushed onto wheeled carts 96 which in the position shown in FIG. 11 are supported substantially flush with the worktable section 90. With the scrap so disposed, for example as denoted by chain outline 98 thereof in FIG. 10, carriages 100 are moved toward the worktable 32 and onto the elevating ramps 102. This motion causes the wheeled carts 96 to lift the scrap 98 from the surface 90 of the table 32. To receive the adjacent end portions of the carts 96 and the associated carriages 100, the worktable 32 is deeply notched or indented at 104. With the carriages 100 in the elevated positions as denoted by chain outline 106 (FIG. 11) thereof, the carts 96 with the scrap thereon are then moved to the right to remove the scrap from the worktable 32. The carts 96 and carriages 100 are moved in this fashion by rack and pinion drives denoted generally and respectively by reference characters 108, 110.

To accommodate the elevating movements of the carts 96, toggle links 112 are coupled individually to the carts 96 and to their push rods 114. On the other hand elevation of the carriages 100 is accommodated by pivot 116 and their shorter push rods 118. When the carriages 100 have been moved to their solid outline positions (FIG. 11) and the carts 96 are withdrawn to their chain outline positions 120 (FIG. 11), the scrap material supported thereon is transferred to the scrap conveyor 94 by means of rack and pinion drives or the like (not shown).

Figure 7:
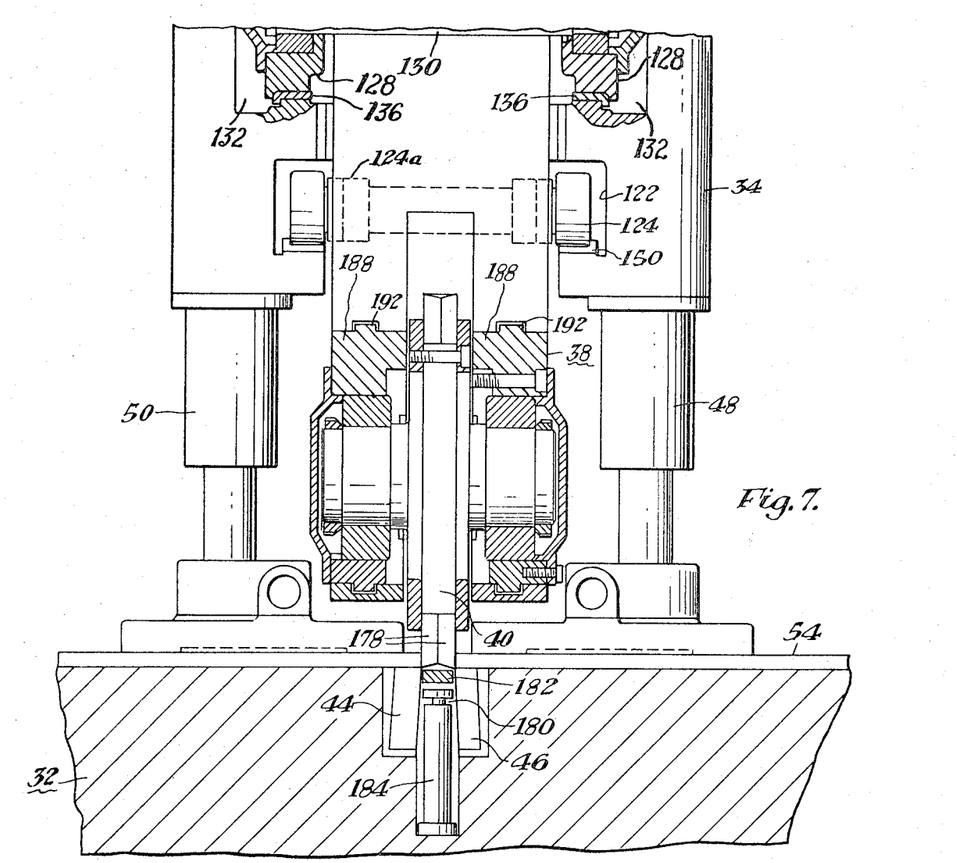
FIGS. 7 and 7A are partial, further enlarged, vertically sectioned views of the apparatus as shown in FIG. 6 and taken generally along reference line VII—VII thereof.
Figure 8:
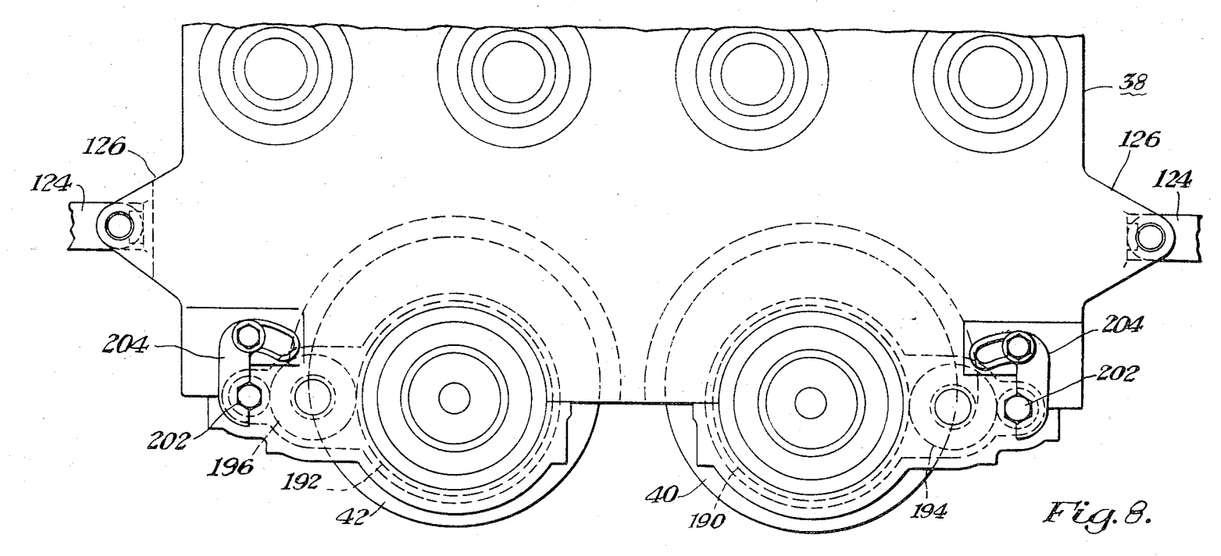
FIG. 8 is an enlarged front elevational view of the cutter carriage as shown in FIGS. 2 and 6.
Figure 9:
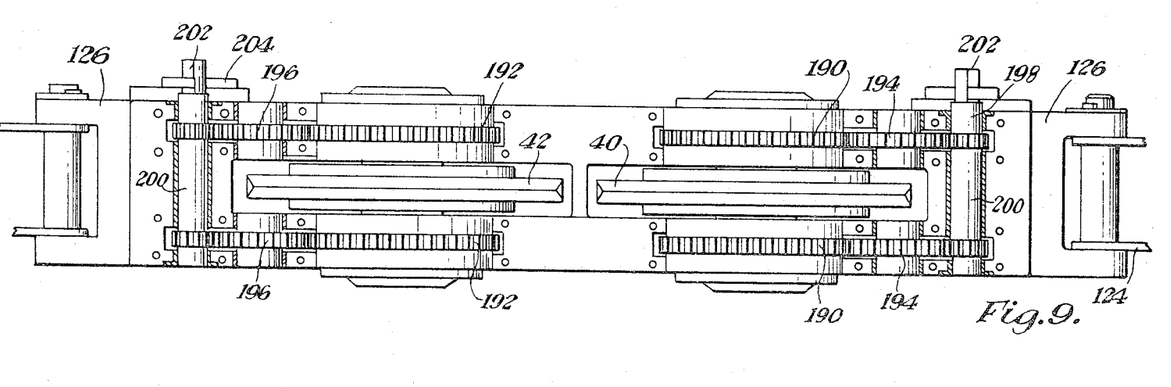
FIG. 9 is a bottom plan view of the carriage as shown in FIG. 8.

Referring now more particularly to FIGS. 2-9 of the drawings, an exemplary form of the knife carriage 38 is disclosed in detail together with means for dragging the carriage 38 across the worktable 32 in scoring and shearing contact with a plate 120 thereon. Such means are operable in conjunction with the contour beam 34 described previously. In furtherance of this purpose the knife carriage is mounted upon the contour beam 34 which, as better shown in FIG. 7 of the drawings, is provided with a pair of guideways 122 to accommodate a roller chain (FIG. 6A) designated generally by reference character 124 and described hereinafter. The adjacent ends of the roller chain 124 are secured to the knife carriage 38 by means of brackets 126 affixed to the front and rear of the carriage (FIGS. 6 and 9).

The knife carriage itself is further provided with a number of pairs of rollers 128 (FIGS. 6 and 7) mounted with suitable bearings on shafts 130 extending through the upper portions of the knife carriage 38. The rollers 128 are substantially enclosed in a pair of guideways 132 likewise formed in the contour beam 34 at positions above but generally parallel to the roller chain guideways 122. The rollers 128 are closely disposed with respective pairs of track members 134, 136 mounted in the contour beam upper guideways 132. When the knife carriage is loaded as when during the cutting operation, rollers 128 bearingly engage the upper track members 134 (FIG. 6) to transfer the transverse, reactive cutting forces to the contour beam 34. On the other hand, when the knife carriage 38 is returned to its initial position or is otherwise unloaded, its weight is exerted against the lower track members 136.

Figure 5:
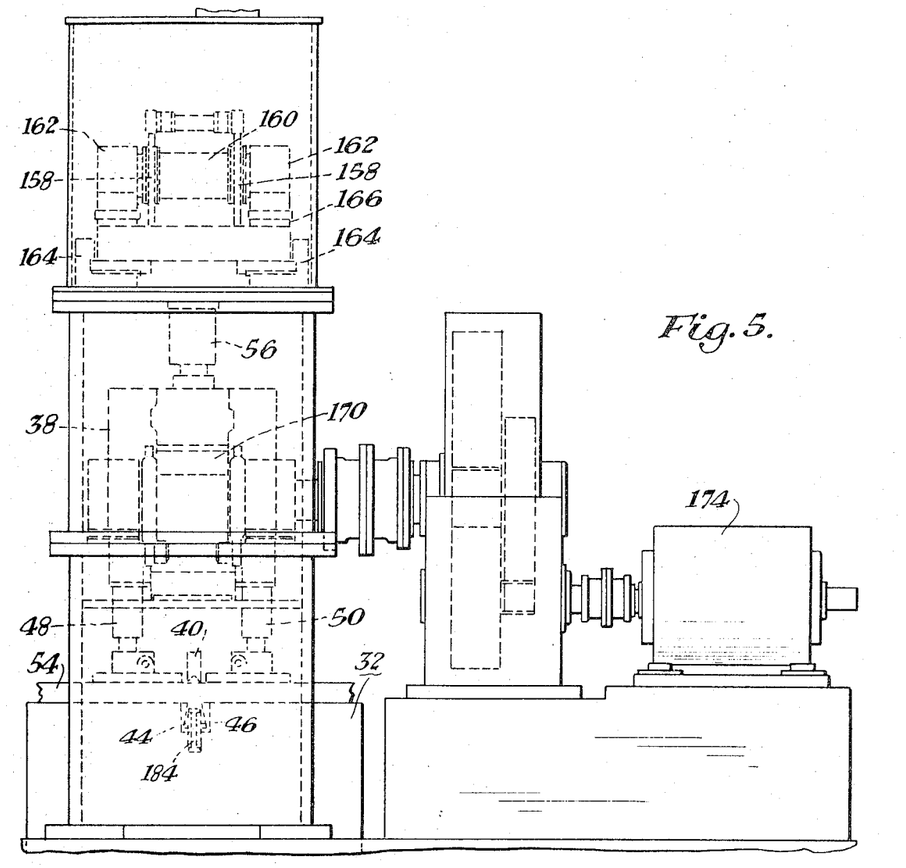
FIG. 5 is a partial enlarged side elevational view of the apparatus as shown in FIG. 3.
Figure 6A:
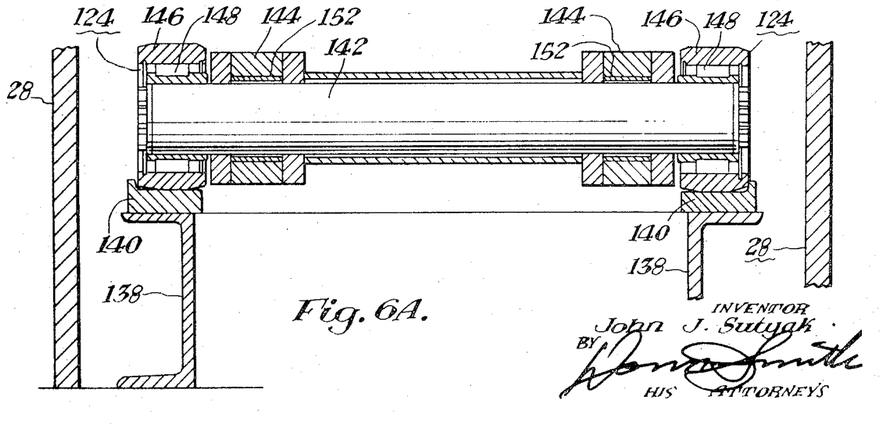
FIG. 6A is a further enlarged, partial cross sectional view of the mechanism as shown in FIG. 6 and taken along reference line VIA—VIA thereof.

Referring now more particularly to FIGS. 5-7 of the drawings, the knife carriage 38 is moved by roller chain 124 the lower run 124a of which is supported throughout its length by the aforementioned guideways 122 of the contour beam 34. As better shown in FIGS. 6 and 6A the upper run 124b of the chain 124 is supported throughout its length by a pair of channeled beams 138 and track members 140 therein forming part of the bridging beam 28 of the cutting apparatus 22. The roller chain 124 is provided with a large number of closely spaced rollers 142 connected through chain links 144. Out rigger rollers 146 are mounted with suitable antifrictional means, such as roller bearings 148, on the outward end portions respectively of each roller 142. The outrigger rollers 146 engage respectively the track members 140 of the supporting beam 28 and similar track members 150 mounted in guideways 122 of the contour beam 34, as better shown in FIG. 7. The chain links 144 desirably are provided with antifrictional means such as sleeve bearings 152 at the points of their engagement with rollers 142.

Figure 3:
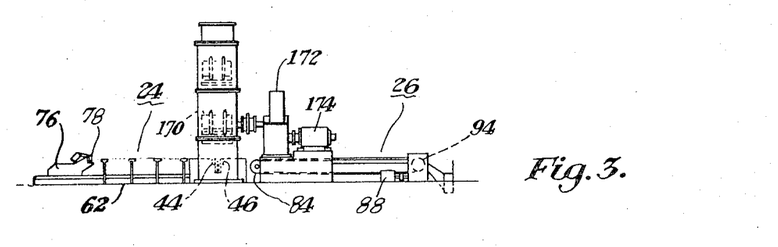
FIG. 3 is a side elevational view of the apparatus as shown in FIG. 2.

The chain 124 with the knife carriage 38 secured thereto is moved across the worktable 32 by engagement of the chain 124 with a number of sprocket means 154, 156, with a pair of the sprocket means being rotatably mounted in this example at each end of the cutting apparatus 22, as better shown in FIGS. 3, 5 and 6.

Each of the sprocket means 154 or 156, as better shown in FIGS. 3 and 5 includes a pair of sprockets 158 secured to shaft 160 for rotation therewith, with the shaft 160 being supported in suitable anti-frictional means such as pillow blocks 162. The sprockets 158 respectively engage the outboard rollers 146 (FIG. 6A) of the roller chain 124. In the arrangement shown the bearing means 162 for the upper pair of sprocket means 154 are slidably mounted at 164 to facilitate tensioning the roller chain 124. In furtherance of this purpose the upper sprocket means pillow blocks are mounted on slide carriages 166 which are moved outwardly and oppositely by conventional chain take-up mechanisms generally denoted by reference characters 168, as better shown in FIG. 6.

In this arrangement one of the lower sprocket means 156, for example the sprocket means 156a (FIG. 6) are employed for driving the roller chain 124. For this purpose, sprocket shaft 170 is extended, as better shown in FIG. 5, for connection to a suitable gearing train 172 or other speed reducer driven by appropriate drive means such as electric motor 174.

Referring again to FIGS. 6-9, an exemplary form of the carriage 38 is illustrated in detail. As pointed out previously the carriage 38 is provided with a pair of tandemly mounted knives 40, 42, which in this example are rotary shear blades, each having a pair of circumferentially shaped knife edges 176 or 178. Each pair of the circumferential knife edges 176, 178 is juxtaposed respectively to the elongated stationary, and generally parallel knives 44, 46 mounted as aforesaid in the worktable 32 or other common support. As better shown in FIGS. 7 and 7A the stationary knives 44, 46 are mounted with a longitudinal space 180 therebetween, and each pair of rotary knife edges 176, 178 are juxtaposed respectively to the stationary knives 44, 46. During the cutting operation the space 180 provides a receptacle for cutting waste, which is subsequently removed from the space 180 by means presently to be described.

In the operation of the cutting apparatus 22, the leading rotary shear for example the blade 40 is vertically adjusted (by means described below) relative to the worktable 32 to produce one or a pair of parallel score lines in the plate material or the like to a depth sufficient to penetrate the work-hardened skin layer thereof. For most edge trimming operations (FIG. 7A) a single score line can be produced, while parallel score lines are necessary for plate slitting or severing (FIG. 7).

When slitting steel plate a penetration between about 4 percent and about 10 percent of the total thickness of the material is adequate to penetrate the work-hardened skin layer. In most applications a penetration of about 4 to 7 percent of the material thickness at the intended cut is sufficient. In any event some minimal penetration by the first cutting means or blade 40 is highly desirable to provide at least a minor relocation of the slitting waste to be subsequently depressed between the elongated knives 44, 46 by the second cutting means or blade 42. This slight dislocation positively prevents the occurrence of edge cracking and other edge deformations that would otherwise be imparted to the adjacent edges of the plate sections parted by the slitting operation. Instead the cutting distortion is transferred almost entirely to the slitting waste as aforesaid. The distortion subsequently imparted to the slitting waste by the second plate 42 coacts with the distortion imparted by the first blade 40 to prevent the slitting waste from curling and jamming between the stationary knives 44, 46. Removal of the slitting waste by means described elsewhere herein can then be accomplished with relative ease. As pointed out previously the maximum useful penetration of the first rotary knife 40 will vary depending upon the thickness of the material, character thereof, and the diameter of the first knife 40. If too great an initial displacement of the slitting waste is imparted to the root thereof, i.e., the area under the knife 40, edge cracking and other edge distortion may result.

The second rotary blade 42 (FIGS. 2 and 6) is mounted on the knife carriage 38 in alignment of its knife edges 178 with the aforementioned score lines respectively. By thus tracking the scoring or relatively slight cutting produced by the first blade, the cutting distortions induced by the second blade 42 are transferred in their entirety to the slitting waste 182. The two-step cutting of the slitting waste causes the distortions imparted successively thereto by the blades 40, 42 to coact upon the slitting waste 182 in such manner that the waste is largely depressed in a straightened condition between the elongated knives 44, 46. Accordingly there is no tendancy for the slitting waste to jam or curl between the elongated blades.

When the slitting waste 182 has been dislocated to an extent equal to about one-third (about 30 to 35 percent) of the thickness of the material, in the case of steel plate, the remainder of the material parts or shears along each of the aforementioned score lines. At this time the second knife 42 has penetrated the material to an equivalent depth, i.e., about one-third or 30 to 35 percent of the material thickness in the case of steel.

In the vast majority of applications it has been found that the preliminary scoring cuts by the first cutting means 40 prevent edge cracking and other edge distortion. The diameter of either cutting means 40 or 42 is not critical, as long as the rotary blade is of sufficient diameter to prevent excessive wearing and to carry the cutting load which depends on plate thickness. In the majority of cases, however, the first or scoring knife 40 can be a smaller diameter. When the second rotary knife 42 becomes sufficiently worn, it can be reground for use as the initial knife 40. In most applications a preferred scoring penetration lies in the range of 4–7 percent of the material thickness.

Figure 7A:
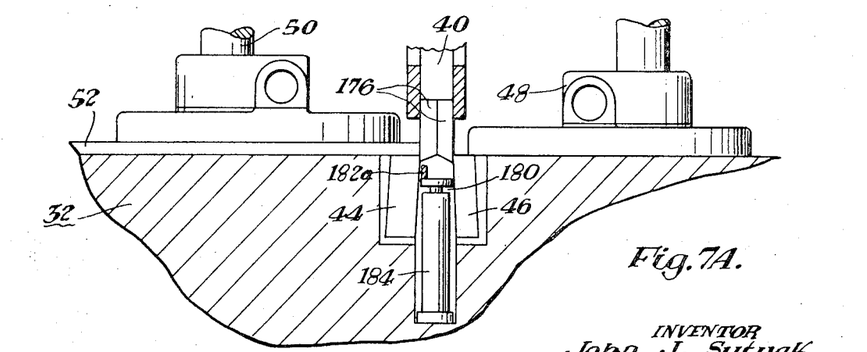

The side surfaces of each rotary blade 40 or 42 are substantially parallel and planar at or adjacent the knife edges 176, 178 thereof, as evident from FIGS. 7 and 7A. This parallelism induces substantially parallel cutting forces at the cut in the material 54 and further minimizes any tendency to edge cracking or other edge distortion.

The second or parting blade 42 is likewise vertically adjusted relative to the worktable 32 so that its knife edges 178 in cooperation with the stationary knives 44, 46 shear or part the relatively narrow waste strip 182 between the aforementioned score lines, to sever the aforementioned plate material very accurately into two sections thereof.

The slitting or trimming waste 182 or 182a (FIGS. 7 or 7A) is dislocated into the space 180 between the stationary blades 46, 44 by the shearing action of the rotary blade 42. After the plate sections are removed, upon release of clamping cylinders 48, 50, the scrap 182 or 182a is removed upwardly (as viewed in FIG. 7) from the space 180 between the stationary knives 44, 46 by a plurality of rejection cylinders 184 (FIGS. 5, 7 and 7A). The scrap 182 is then removed from the table 32 in the manner described previously.

To provide the aforementioned vertical adjustment means for each of the rotary blades 40 or 42, the latter are respectively and rotatably mounted within a pair of eccentric bearing housings 186 or 188 supported on the knife carriage 38 as better shown in FIGS. 7-9 of the drawings. Vertical adjustment of each of the rotary blades 40 or 42 is effected by angularly displacing the associated eccentric bearing housing 186 or 188. In furtherance of this purpose each of the bearing housings 186 or 188 is provided with a circumferential gear 190 or 192 formed in this example integrally therewith. As better shown in FIGS. 8 and 9 the bearing housing gears can be rotated respectively by enmeshed idler gears 194, 196 and pinion shafts 198, 200. Each pinion shaft desirably is provided with a wrench configuration 202 protruding outwardly of the knife carriage 38 for engagement by a suitable tool. When such adjustment has been made to the user's satisfaction, the pinion shafts 198, 200 are locked against further revolution by clamp plates 204.

From the foregoing it will be apparent that novel and efficient forms of edging and slitting methods and apparatus have been described herein. While I have shown and described certain presently preferred embodiments of the invention and have illustrated presently preferred methods of practicing the same it is to be distinctly understood that the invention is not limited thereto but may be variously embodied and practiced within the spirit and scope of the invention.

I claim:

1. A method of cutting steel plate, said method comprising the steps of supporting said plate on elongated cutting means co-extending with an intended cut in said plate and aligned therewith, scoring said plate along said intended cut to a depth approximately equal to the surface hardness depth of said plate to prevent edge-cracking at said cut, and tandemly cutting said plate to a further depth along said scoring sufficient to part said plate at said cut.

2. The method according to claim 1 wherein the last-mentioned cutting step is limited to a depth less than the total thickness of said plate.

3. The method according to claim 1 including the modified step of scoring said material to depth equal at least to about 4 percent of said material thickness.

4. The method according to claim 3 including the modified step of scoring said material to a depth less than about 10 percent of the thickness of said material.

5. The method according to claim 4 including the modified step of scoring said material to a depth between about 4 and 7 percent of said material thickness.

6. The method according to claim 1 wherein said material is steel plate, and said further depth is between about 30 percent and about 35 percent of said material thickness.

7. A method of slitting steel plate, said method comprising the steps of supporting said plate on a pair of generally parallel and elongated cutting means co-extending respectively with intended parallel cuts in said plate and aligned therewith, scoring said plate along each of said cuts respectively to form score lines each extending to a depth approximately equal to the surface hardness depth of said plate to prevent edge-cracking at said intended cuts, and tandemly slitting said plate along each of the score lines so as to coincide with said scoring and to part said plate at said cut lines.

8. The method according to claim 7 including the additional steps of coacting said scoring and slitting steps to impart cutting distortions of said scoring and slitting steps substantially exclusively to slitting waste between said score lines, and tandemly removing said slitting waste from said plate.

9. The method according to claim 8 including the additional step of coacting said cutting distortions upon said slitting waste such that said waste is prevented from curling and jamming between said elongated cutting means.

10. The method according to claim 7 wherein said scoring step is accomplished by substantially parallel forces applied generally normal to the surface of said plate.

11. The method according to claim 7 wherein said scoring and said slitting steps incrementally dislocate a strip of slitting waste from said plate such that substantially all of the cutting distortions thereof are imparted to said waste.

12. A method of slitting thick plate-like material, said method comprising the steps of supporting said material on elongated cutting means coextended with an intended cut in said material and aligned therewith, scoring said material along said cut, parting said material along said scoring, the forces normally varying between the ends and the middle of said cut, and applying an array of contour forces along said cut and in conjunction with said scoring and parting forces and in substantially the same direction thereof, and varying the profile of said contour forces in compensation for the variation of said scoring and said parting forces.

13. The method according to claim 12 wherein said contour forces are applied oppositely and variably between said scoring and parting forces and a series of back-up forces operable along said cut.

14. The method according to claim 7 wherein said material is scored to a depth at least equal to the surface hardness thereof and is slit to a further depth less than the thickness of said material.

15. The method according to claim 14 wherein said material is steel plate, and said further depth is between about 30 percent and about 35 percent of said material thickness.

16. The method according to claim 14 including the modified step of scoring said material to a depth less than about 10 percent of the thickness of said material.

17. A method of slitting thick steel plate, said method comprising the steps of applying generally parallel series of forces to one side of said plate, coinciding said force series respectively with intended parallel slitting cuts in said plate, scoring the other side of said plate in opposition to said forces respectively and along each of said intended cuts to a depth approximately equal to the surface hardness depth of said plate to prevent edge cracking at said intended cut, and tandemly slitting said plate in opposition to said forces along each of the score lines so as to coincide with said scoring.

* * * * *